US010870097B2

(12) United States Patent
Bell

(10) Patent No.: US 10,870,097 B2
(45) Date of Patent: Dec. 22, 2020

(54) ELASTOMER RHEOLOGY SYSTEM AND PROCESS

(71) Applicant: Ardent Mills, LLC, Denver, CO (US)

(72) Inventor: Sumana Bell, St. Paul, MN (US)

(73) Assignee: Ardent Mills, LLC, Denver, CO (US)

( * ) Notice: Subject to any disclaimer, the term of this patent is extended or adjusted under 35 U.S.C. 154(b) by 224 days.

(21) Appl. No.: 15/879,605

(22) Filed: Jan. 25, 2018

(65) Prior Publication Data

US 2018/0207605 A1 Jul. 26, 2018

Related U.S. Application Data

(60) Provisional application No. 62/450,241, filed on Jan. 25, 2017.

(51) Int. Cl.
*B01J 19/00* (2006.01)
*G05D 7/06* (2006.01)
*A21C 1/14* (2006.01)

(52) U.S. Cl.
CPC ........... *B01J 19/0006* (2013.01); *A21C 1/146* (2013.01); *G05D 7/0617* (2013.01); *B01J 2219/00202* (2013.01); *B01J 2219/00211* (2013.01); *B01J 2219/00222* (2013.01); *B01J 2219/00231* (2013.01); *C08F 2400/02* (2013.01);
(Continued)

(58) Field of Classification Search
None
See application file for complete search history.

(56) References Cited

U.S. PATENT DOCUMENTS 5,106,636 A * 4/1992 Ban .................. G01N 33/10
426/231
5,466,143 A * 11/1995 Suzuki .................. A21C 3/02
425/140
(Continued)

FOREIGN PATENT DOCUMENTS

EP 0182563 A2 5/1986
EP 0457531 A1 11/1991
EP 0410818 B1 5/1995

OTHER PUBLICATIONS

Kokelaar, J.J, et al., "Strain Hardening Properties and Extensibility of Flour and Gluten Doughs in Relation to Breadmaking Performance," Journal of Cereal Science, vol. 24, Issue 3 (Nov. 1996), pp. 199-214. (Year: 1996).*

(Continued)

*Primary Examiner* — Matthew D Krcha
(74) *Attorney, Agent, or Firm* — Ryan T Grace; Advent, LLP

(57) ABSTRACT

An elastomer rheology process can include: receiving material formation data associated with an elastomer; conveying the elastomer towards one or more rollers that compress and stretch the elastomer according to a predetermined rolling profile comprising roller gap and speed settings; sensing a first dimension of a first portion of the elastomer before the first portion of the elastomer is passed through the sheeter; sensing a second dimension of a second portion of the elastomer after the second portion of the elastomer is passed through the sheeter; and calculating an elastomer property of the elastomer based on the controlled roller gap width, a measured roller force, the first dimension, and the second dimension.

26 Claims, 19 Drawing Sheets

(52) U.S. Cl.
CPC ...... *C08F 2500/17* (2013.01); *C08F 2810/10* (2013.01); *C08J 2300/26* (2013.01)

(56) References Cited

U.S. PATENT DOCUMENTS

| | | | |
|---|---|---|---|
| 5,888,573 A * | 3/1999 | Hayashi | A21C 3/04 |
| | | | 426/502 |
| 2015/0181897 A1* | 7/2015 | Israni | A21C 1/1465 |
| | | | 426/231 |

OTHER PUBLICATIONS

Notification of Transmittal of the International Search Report and Written Opinion of the Searching Authority dated May 4, 2018.
S. Chakrabarti-Bell et al.; "Computational Modeling of Dough Sheeting and Physical Interpretation of the Non-Linear Rheological Behavior of Wheat Flour Dough"; Journal of Food Engineering, Sep. 2010, Vo. 100, pp. 278-288.
M.J. Patel et al.; "Flour Quality and Dough Elasticity: Dough Sheetability"; Journal of Food Engineering, Apr. 2013, vol. 115, pp. 371-383.
Milan J. Patel et al.; "On the Use of Conventional Dough Extension Tests in Characterising Flours for Dough Sheetability. I. Experiments"; Int. J. Food Eng., 2016, pp. 221-230.
Milan J. Patel et al.; "On the Use of Conventional Dough Extension Tests in Characterising Flours for Dough Sheetability. II. Simulations"; Int. J. Food Eng., 2016.

* cited by examiner

Example use of treated data

| Flour (Optimal water dough) | Coefficient of Apparent Strain-hardening, $K_s$ (kPa) | Index of Apparent Strain-hardening N | Coefficient of Elastic Rebound, $K_r$ (/kPa) | Index of Elastic rebound (M) |
|---|---|---|---|---|
| DNS | 3.45 | 1.05 | 0.19 | 0.19 |
| CWRS | 1.9 | 1.0 | 0.2 | 0.5 |
| W | 2.95 | 1.03 | 0.18 | 0.37 |
| I | 3.7 | 1.06 | 0.19 | 0.18 |
| ASW | 2.9 | 1.1 | 0.16 | 0.42 |

FIG. 18

ELASTOMER RHEOLOGY SYSTEM AND PROCESS

CROSS-REFERENCE TO RELATED APPLICATIONS

The present application claims the benefit under 35 U.S.C. § 119(e) of U.S. Provisional Application Ser. No. 62/450,241, filed Jan. 25, 2017, and titled "ELASTOMER RHEOLOGY SYSTEM AND PROCESS," which is incorporated herein by reference in its entirety.

BACKGROUND

Many polymeric materials or elastomers are viscoelastic, meaning they stretch and recoil like rubber bands. Bread doughs are also viscoelastic and like rubber bands, they also stretch, work-harden (also referred to as "strain-hardening") and recoil. However, unlike rubber bands, bread doughs recoil only partially. In addition, such stretch and recoil responses vary with the speed at which materials are deformed. These mechanical behaviors are part of dough's rheology, which is an important aspect of flour quality for end use product applications. Dough rheology information is sought by breeders for developing new varieties of wheat, by millers to develop flour blends, by bakeries to develop dough formulations, and by ingredient suppliers for developing additives to modify dough properties. This means that flours (and wheat) are evaluated for end use quality all along the supply chain of wheat. At present time, in cereal sciences, dough is characterized by measuring only the stretching qualities of doughs. This information forms part of the dataset that is used to assess the fate of wheat—food or feed. It has been observed that the current dough rheology tests do not relate to flour or dough differences (processing and baking qualities).

SUMMARY

This Summary is provided to introduce a selection of concepts in a simplified form that are further described below in the Detailed Description. This Summary is not intended to identify key and/or essential features of the claimed subject matter. Also, this Summary is not intended to limit the scope of the claimed subject matter in any manner.

Aspects of the disclosure can relate to an elastomer rheology process. The elastomer rheology process can include: receiving material formation data associated with an elastomer; conveying the elastomer towards one or more rollers that compress and stretch the elastomer according to a predetermined rolling profile comprising roller gap and speed settings, wherein the roller gap settings can implement a gradual gap reduction and the roller speed settings can implement a static or dynamic roller speed (e.g., gradually increasing/decreasing roller speeds); sensing a first dimension of a first portion of the elastomer (e.g., sensing height and/or width of the elastomer) before the elastomer is passed through the sheeter; sensing a second dimension (e.g., to determine resistance exerted by the elastomer on the rollers as it stretches) as the elastomer pad is passed through the sheeter; and calculating an elastomer property of the elastomer based on the controlled roller gap width, a measured roller force, the first dimension, and the second dimension. This operation of stretching the elastomer pad can be repeated several times by reversing direction of entry into the roller gaps, each time measuring the height, width and forces. It is noted that although the drawings (e.g., FIG. 2) show single-direction operation of the sheeter (e.g., from left to right), the sheeter is configured to operate bi-directionally (e.g., from left to right, and from right to left). Such operations provide information, such as, but not limited to, stretch, recoil, and work-hardening as a function of roller speeds.

Aspects of the disclosure can also relate to a controller having a communications interface and a processor that is communicatively coupled to a memory. The memory can include one or more software modules that, when executed by the processor, cause the processor to: receive, via the communications interface, material formation data (description of material and/or process for forming the material) associated with an elastomer; control a roller gap for a sheeter that processes the elastomer when the elastomer is passed through the sheeter; receive, via the communications interface, sensor information associated with a first dimension of a first portion of the elastomer before the first portion of the elastomer is passed through the sheeter; receive, via the communications interface, sensor information associated with a second dimension of a second portion of the elastomer after the second portion of the elastomer is passed through the sheeter; and calculate an elastomer property of the elastomer based on the roller gap width, a measured roller force, the first dimension, and the second dimension.

Aspects of the disclosure can also relate to a rheology system including a sheeter with a controller integrated within or otherwise communicatively coupled to the sheeter. The sheeter can include one or more actuators configured to position and drive one or more rollers of the sheeter. The sheeter can also include one or more sensors configured to sense one or more dimensions of an elastomer when the elastomer is being processed by the sheeter. The controller can have a communications interface and a processor that is communicatively coupled to a memory. The memory can include one or more software modules that, when executed by the processor, cause the processor to: receive, via the communications interface, material formation data associated with an elastomer; control a roller gap for a sheeter that processes the elastomer when the elastomer is passed through the sheeter; receive, via the communications interface, sensor information associated with a first dimension of a first portion of the elastomer before the first portion of the elastomer is passed through the sheeter; receive, via the communications interface, sensor information associated with a second dimension of a second portion of the elastomer after the second portion of the elastomer is passed through the sheeter; and calculate an elastomer property of the elastomer based on the roller gap width, a measured roller force, the first dimension, and the second dimension.

DRAWINGS

The Detailed Description is described with reference to the accompanying figures.

FIG. 18 shows a table of elastomer properties collected for elastomers by a sheeter, such as the sheeter illustrated in FIG. 2.

DETAILED DESCRIPTION

Aspects of the disclosure are described more fully hereinafter with reference to the accompanying drawings, which form a part hereof, and which show, by way of illustration, example features. The features can, however, be embodied in many different forms and should not be construed as limited to the combinations set forth herein; rather, these combinations are provided so that this disclosure will be thorough and complete, and will fully convey the scope. Among other things, the features of the disclosure can be embodied as formulations, food products, processes, processes for making food products, and processes for making formulations. The following detailed description is, therefore, not to be taken in a limiting sense.

Some aspects of this disclosure relate to techniques for measuring both stretching and recoil characteristics of doughs as a function of rate of stretch. It has been found that a sheeting process can be employed to characterize doughs and other elastomers. A rheology process and system are disclosed herein. The rheology process and system can provide quantitative, objective measures for both stretching and elastic responses of elastomers. Dough has characteristics of an elastomer and a foam, including gas bubbles that are invisible to the naked eye; while baking is a process for converting this 'invisible' foam (e.g., uncooked dough) into a visible foam (e.g., bread). The elastomer characteristics of dough are exhibited through stretches and elastic recoveries of doughs, and the rheology system and process disclosed herein can be used to assess the stretch and the recovery of dough height (i.e., the elasticity) upon exiting a roller gap of a step thickness reduction device, such as a sheeter. The rheology system and process can thereby provide insights into a flour's effects on dough quality, and other factors (e.g., other ingredient levels, mixing times, etc.). Elastomers can vary in consistency with bread doughs being softer than rubbers. Elastomers are of great interest to non-food industries as well. Thus, techniques described herein can be employed in multiple industries. For example, the sensor technology for measuring forces and sheet thickness along with derivation of stress-strain-recovery strain plots can be implemented on industrial scale sheeting lines. Such implementations can provide real time or near real time control of sheeting operations for edible elastomers (e.g., doughs, chewing gums, pastes, gummies, marshmallows, or the like) and also for industrial elastomers (e.g., metal elastomers, and rubber tires and other rubbers, insulation elastomers, and so forth).

Figure 1:
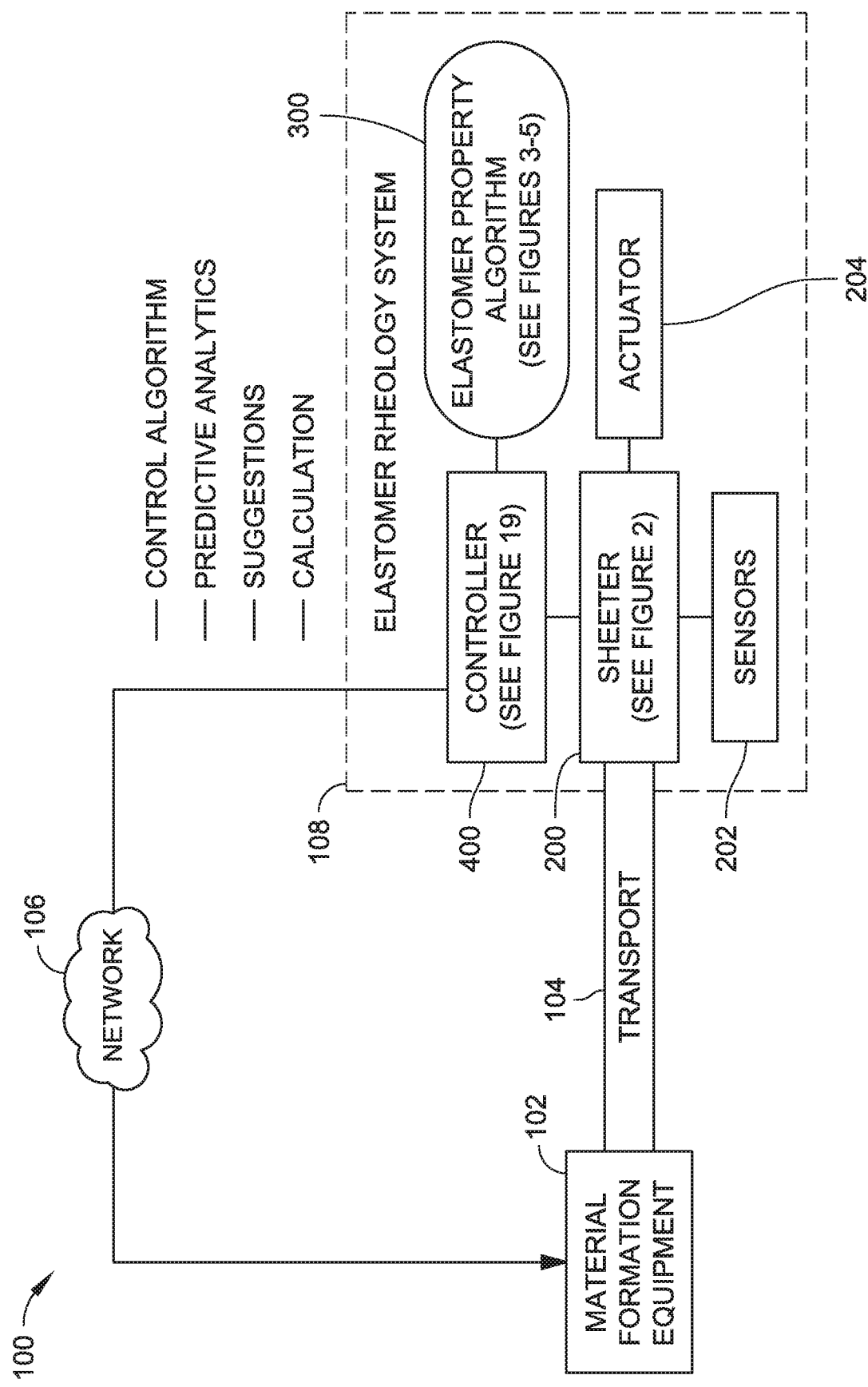
FIG. 1 is a block diagram of an environment that can employ an elastomer rheology system, in accordance with an embodiment of the present disclosure.

FIG. 1 is a block diagram of an environment 100 that can employ an elastomer rheology system 108. The environment 100 can include material formation equipment 102. In an embodiment, the material formation equipment 102 can include mixing equipment for mixing dough components (e.g., flour, water, yeast, etc.) or any other elastomer components. In some embodiments, the material formation equipment 102 can include a chamber for melting components together or facilitating a chemical or physical reaction in one or more components housed in the chamber. The environment 100 can also include a transport channel 104 for conveying material formation data to the elastomer rheology system 108. In an embodiment, the transport channel 104 can include a network connection (e.g., via network 106), a direct connection, or other communicative coupling between the material formation equipment 102 and the elastomer rheology system 108. In some embodiments, the transport channel 104 can include a user facilitated transport of material formation data to the elastomer rheology system 108. For example, a user can transport material formation data via a portable memory device (e.g., flash drive or external hard drive) or the user can manually enter the material formation data to the elastomer rheology system 108.

The elastomer rheology system 108 can be configured to determine one or more elastomer properties of an elastomer produced by the material formation equipment 102. In embodiments, the elastomer rheology system 108 can execute an elastomer rheology process, such as the process 300 described herein, to determine the one or more elastomer properties. The elastomer rheology system 108 can be configured to report information associated with an elastomer property via a communication device (e.g., transmitter) and/or a user interface device (e.g., a display or other indicator). For example, information can include quantitative or qualitative assessments associated with elastomer properties, predictive analytics, or suggestions for changing one or more material formation parameters (e.g., amount of a component, presence or absence of a component, time of a process operation, and/or addition or removal of a process operation). In embodiments where the material formation equipment 102 and the elastomer rheology system 108 are communicatively coupled (e.g., directly or via network 106), the elastomer rheology system 108 can be configured to report elastomer properties, predictive analytics, suggestions, or the like, to the material formation equipment 102. In some embodiments, the elastomer rheology system 108 can be configured to transmit one or more control signals to the material formation equipment 102, or instructions to a controller for the material formation equipment. For example, transmitted control signals or instructions can include instructions or signals associated with changing material formation parameters, or establishing new material formation parameters, based on a comparison between a determined (e.g., calculated) elastomer property and a predetermined (e.g., programmed or user specified) threshold or range.

In an embodiment, the rheology system 108 includes a sheeter 200 that processes an elastomer 201 (e.g., dough) by running the elastomer 201 through one or more rollers configured to apply a flattening force on the elastomer 201. The sheeter 200 can include a frame that supports a conveyor 208 (e.g., conveyor belt or conveyance rollers) for transporting an elastomer through the sheeter 200. For example, the conveyer 208 may include a feeder belt 208A (or feeder rollers) and an exit belt 208B (or exit rollers). In some embodiments, the feeder belt 208A (or feeder rollers) are driven by a respective motor 210A and the exit belt 208B (or exit rollers) can also be driven by a respective motor 210B. The frame may further support at least one actuator 204 (e.g., motor, linear actuator, or the like), an adjustable roller gap (e.g., one or more repositionable rollers 206), and one or more sensors 202. In some embodiments, the rollers 206 include at least one upper roller 206A and at least one lower roller 206B. In other embodiments, the system 108 may include only one roller or set of rollers (e.g., only upper roller(s) 206A or lower roller(s) 206B). In an embodiment, the one or more actuators 204 (e.g., upper actuator 204A and/or lower actuator 204B) are configured to position and drive one or more rollers 206 of the sheeter 200. The roller gap may be self-adjusting; for example, the one or more actuators 204 can be configured to automatically adjust the roller gap to implement a step thickness reduction from one sheeter pass to the next.

Figure 2:
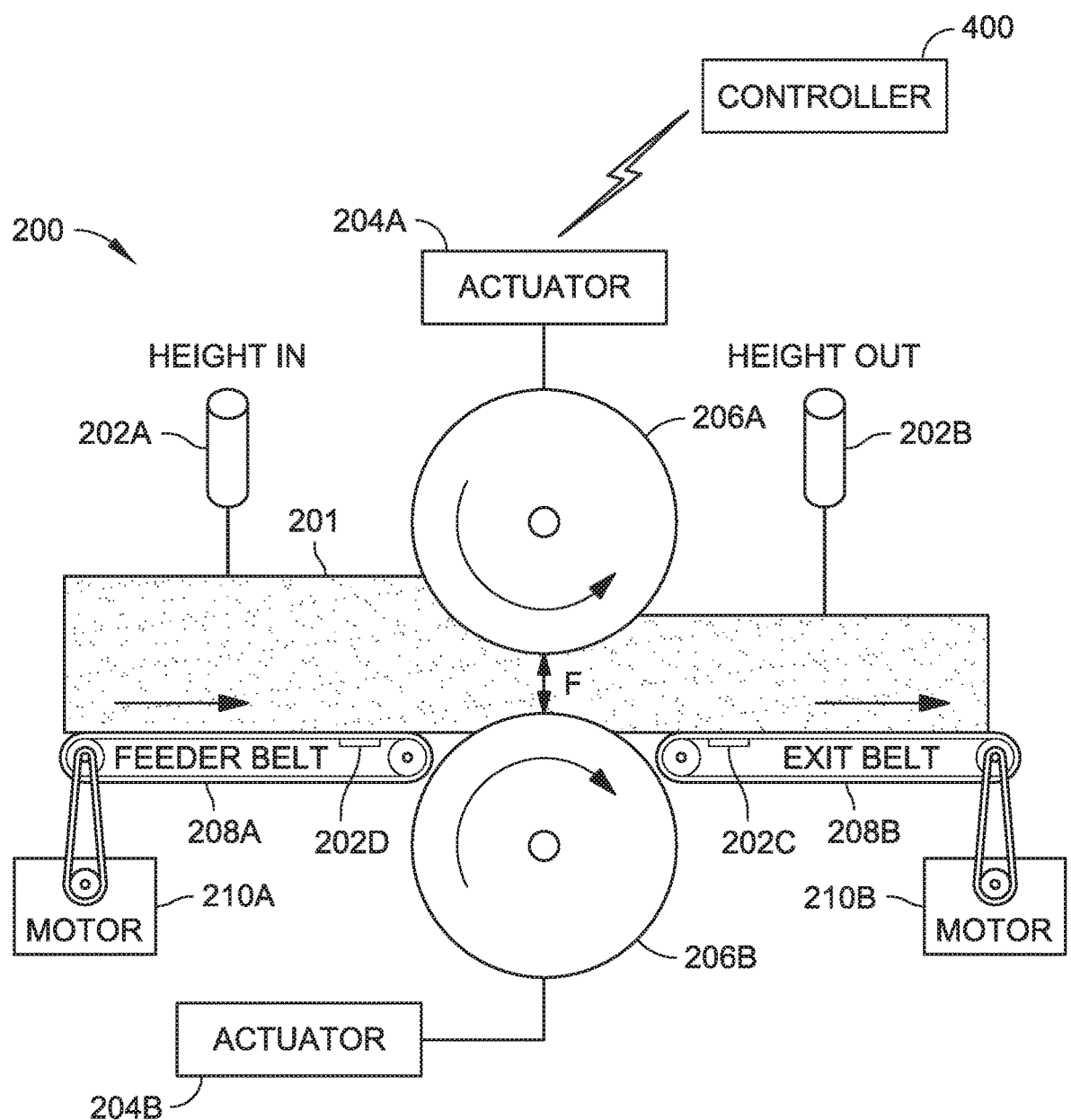
FIG. 2 shows a sheeter of the elastomer rheology system in FIG. 1, in accordance with an embodiment of the present disclosure. It is noted that although the FIG. 2 shows single-direction operation of the sheeter (e.g., from left to right), the sheeter is configured to operate bi-directionally (e.g., from left to right, and from right to left).

Although an embodiment of the sheeter 200 with multiple, independent actuators 204 and/or motors 210 is shown in FIG. 2, in some embodiments, the actuators 204A and 204B are implemented by a single actuator 204 (e.g., using a belt drive system, a system of gears, or the like). Similarly, motors 210A and 210B can be implemented by a single motor 210. In some embodiments, the actuators 204A and 204B and the motors 210A and 210B can all be implemented by a single actuator or motor (e.g., using a belt drive system, a system of gears, or the like).

The one or more sensors 202 can be configured to sense one or more dimensions of an elastomer when the elastomer 201 is being processed by the sheeter 200. For example, the one or more sensors 202 can include one or more height sensors, thickness sensors, surface area sensors, longitudinal extension sensors, latitudinal extension sensors, any combination of the foregoing dimension sensors, and the like. As shown in FIG. 2, the one or more sensors 202 can include, but are not limited to, a first sensor 202A in proximity to a first side (e.g., an entrance) of the roller gap and a second sensor 202B in proximity to a second side (e.g., an exit) of the roller gap. In some embodiments, the one or more sensors 202 can include one or more bottom-located sensors (e.g., sensors 202C and 202D) or sensors on sides of the conveyor 208. The one or more sensors 202 can include, but are not limited to, optical sensors, pressure/force sensors, sonic sensors, ultrasonic sensors, thermal sensors, moisture sensors, or the like. In embodiments, the sensors 202 include laser profile sensors/scanners for measuring one or more dimensions (e.g., height/thickness, width, and/or length) of the elastomer 201. For example, sensor 202A may be a laser profile sensor/scanner configured to measure one or more dimensions of the elastomer 201 at a first side (e.g., an entrance) of the roller gap and sensor 202B may be laser profile sensor/scanner configured to measure one or more dimensions of the elastomer 201 at a second side (e.g., an exit) of the roller gap. In embodiments, the sensors 202 include pressure or load sensors for measuring pressure or load on the rollers 206 and/or conveyor 208. For example, sensor 202D may be a pressure or load sensor configured to measure pressure or load on the rollers 206 or conveyor 208 at a first side (e.g., an entrance) of the roller gap and sensor 202C may be a pressure or load sensor configured to measure pressure or load on the rollers 206 or conveyor 208 at a second side (e.g., an exit) of the roller gap. In some embodiments, sensors 202 can also include dough temperature and/or moistures sensors, strain gauges, and so forth.

Figure 19:
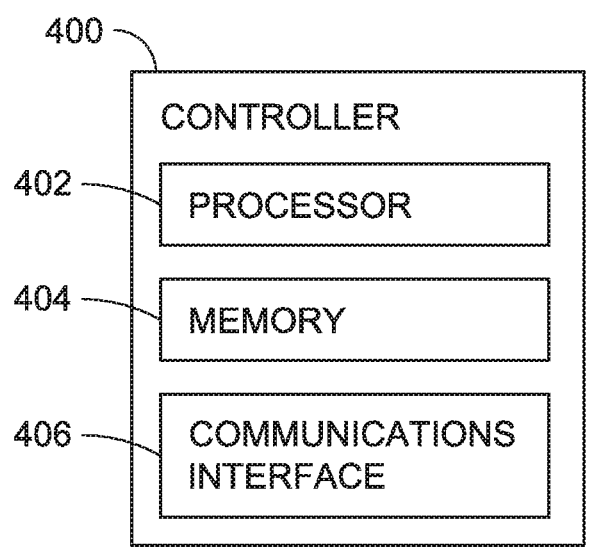
FIG. 19 is a block diagram of a controller for the elastomer rheology system illustrated in FIG. 1.

The sheeter 200 can be computerized with real time or near real time monitoring of data. For example, the rheology system 108 can include a controller 400 that calculates stress, strain and delivery data for strain-hardening, and/or elasticity measurements associated with an elastomer being processed by the sheeter 200. The controller 400 can be communicatively coupled to the one or more sensors 202 and the one or more actuators 204 of the sheeter 200. As shown in FIG. 19, the controller 400 can include a communications interface 406 (e.g., a transmitter, receiver, and/or transceiver) for connecting to sensors 202, actuators 204, and other external devices or to a network (e.g., network 106). In some embodiments, the communications interface 406 can include a user interface device (e.g., a display device, touch panel, keyboard, mouse, speaker, microphone, or the like) for receiving user inputs and/or displaying information for a user. The controller 400 may be an embedded controller, a workstation, notebook computer, mobile device, or any computing device, computing system, or controller that includes at least one processor 402 in communication with a memory 404 (e.g., a hard disk drive (HDD), solid state disk (SSD), flash memory, or the like) that has software modules stored thereon. The software modules can include one or more software modules that, when executed by the processor 402, cause the processor 402 to perform various operations of the process 300 described herein.

In embodiments, the processor 402 provides processing functionality for at least the controller 400 and can include any number of processors, micro-controllers, circuitry, field programmable gate array (FPGA) or other processing systems, and resident or external memory for storing data, executable code, and other information accessed or generated by the controller 400. The processor 402 can execute one or more software programs embodied in a non-transitory computer readable medium (e.g., memory 404) that implement techniques/algorithms described herein. The processor 402 is not limited by the materials from which it is formed or the processing mechanisms employed therein and, as such, can be implemented via semiconductor(s) and/or transistors (e.g., using electronic integrated circuit (IC) components), and so forth.

The memory 404 can be an example of tangible, computer-readable storage medium that provides storage functionality to store various data and or program code associated with operation of the controller 400, such as software programs and/or code segments, or other data to instruct the processor 402, and possibly other components of the rheology system 108/sheeter 200, to perform the functionality described herein. Thus, the memory 404 can store data, such as a program of instructions for operating the rheology system 108/sheeter 200 (including its components), and so forth. It should be noted that while a single memory 404 is described, a wide variety of types and combinations of memory (e.g., tangible, non-transitory memory) can be employed. The memory 404 can be integral with the processor 402, can comprise stand-alone memory, or can be a combination of both. Some examples of the memory 404 can include removable and non-removable memory components, such as random-access memory (RAM), read-only memory (ROM), flash memory (e.g., a secure digital (SD) memory card, a mini-SD memory card, and/or a micro-SD memory card), magnetic memory, optical memory, universal serial bus (USB) memory devices, hard disk memory, external memory, and so forth.

The communications interface 406 can be operatively configured to communicate with components of the rheology system 108/sheeter 200. For example, the communications interface 406 can be configured to transmit data for storage in the rheology system 108/sheeter 200, retrieve data from storage in the rheology system 108/sheeter 200, and so forth. The communications interface 406 can also be communicatively coupled with the processor 402 to facilitate data transfer between components of the rheology system 108/sheeter 200 and the processor 402 (e.g., for communicating inputs to the processor 402 received from a device (e.g., sensors 200) communicatively coupled with the controller 400). It should be noted that while the communications interface 406 is described as a component of controller 400, one or more components of the communications interface 406 can be implemented as external components communicatively coupled to the rheology system 108/sheeter 200 via a wired and/or wireless connection. The rheology system 108/sheeter 200 can also include and/or connect to one or more input/output (I/O) devices (e.g., via the communications interface 406), such as a display, a mouse, a touchpad, a touchscreen, a keyboard, a speaker, a microphone (e.g., for voice commands), imaging device (e.g., camera), and so on.

Figure 3:
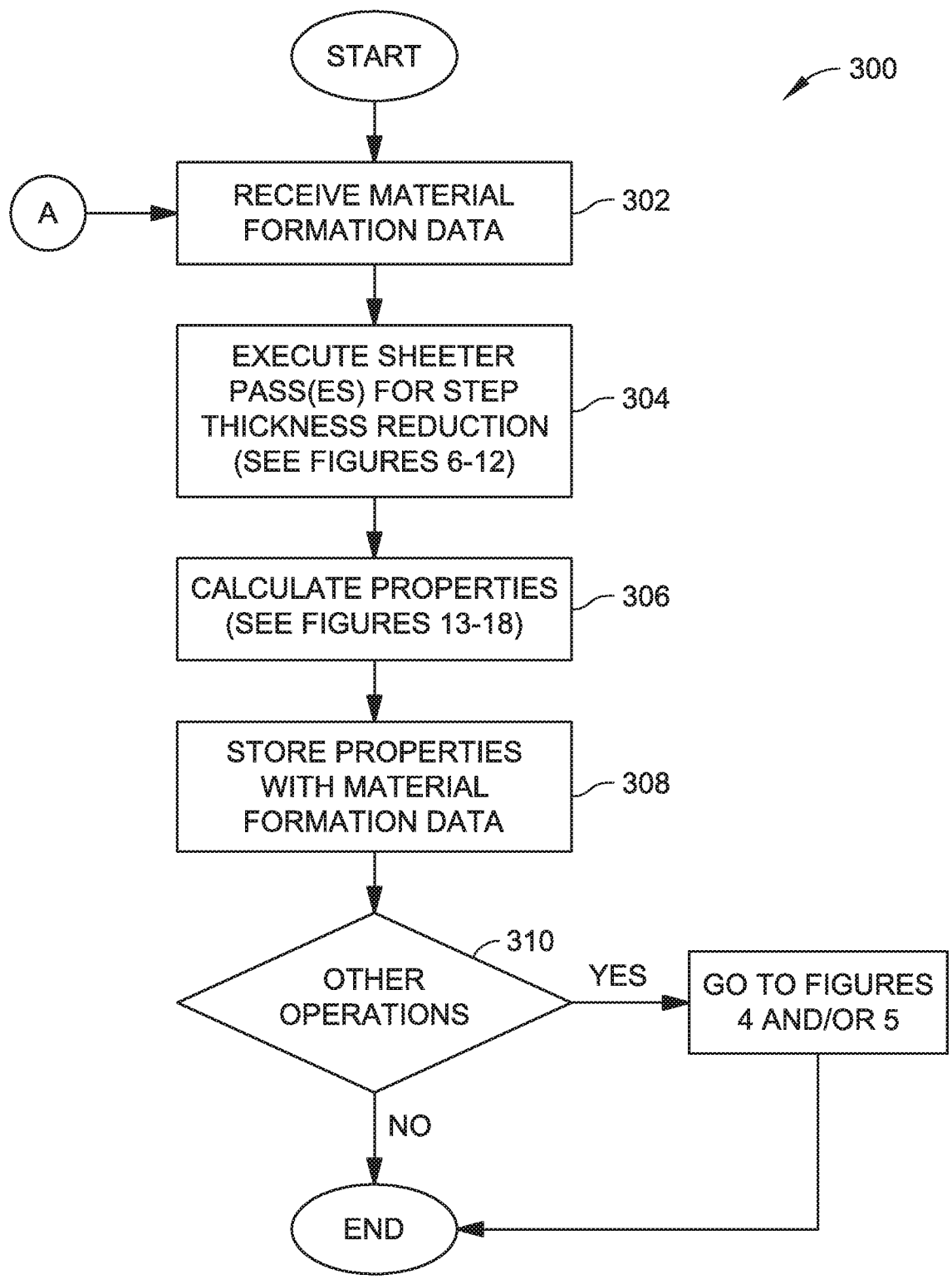
FIG. 3 is a flow diagram showing an example implementation of an elastomer rheology process.
Figure 4:
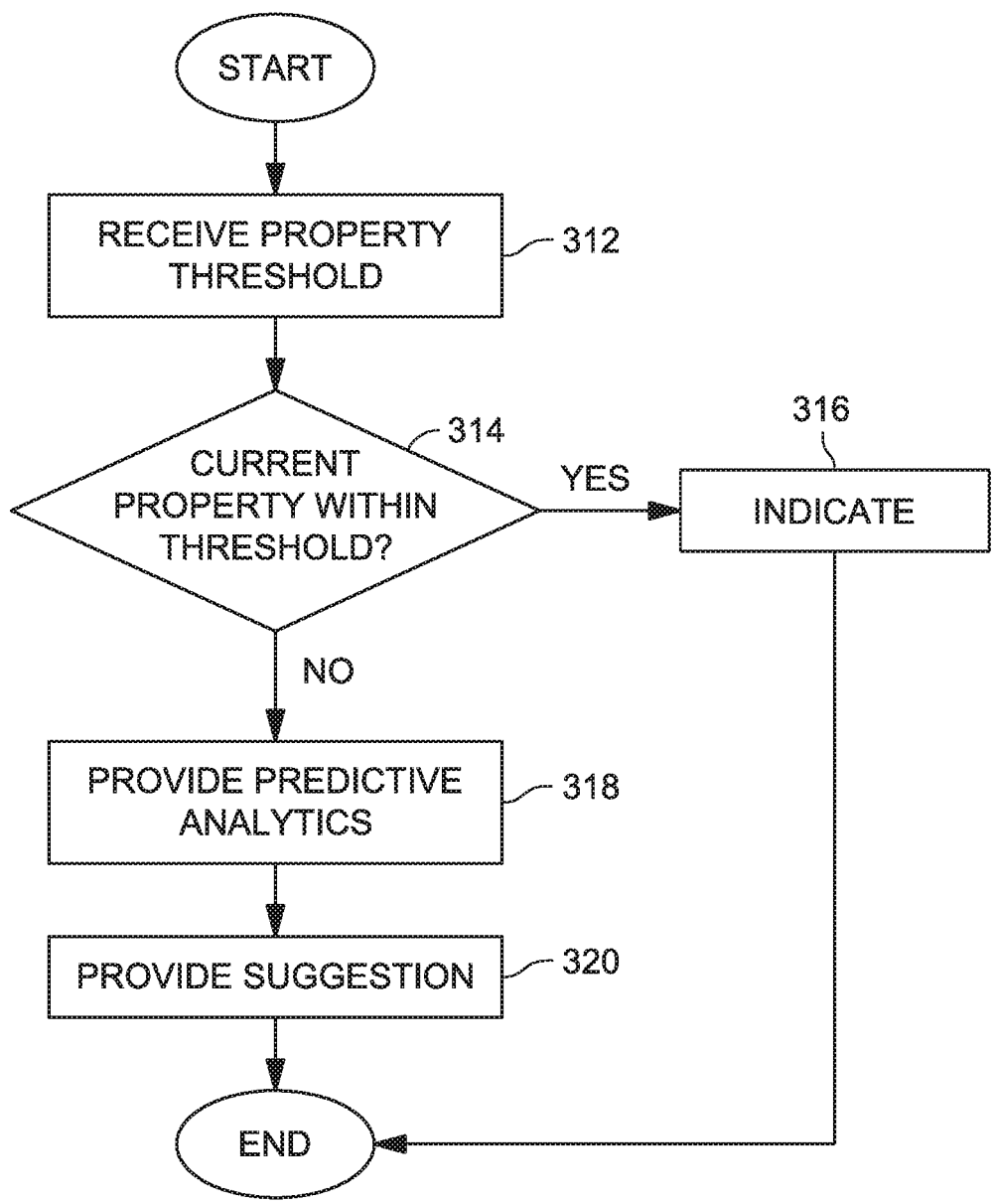
FIG. 4 is a flow diagram showing additional operations of the elastomer rheology process illustrated in FIG. 3, in accordance with an example implementation of the present disclosure.
Figure 5:
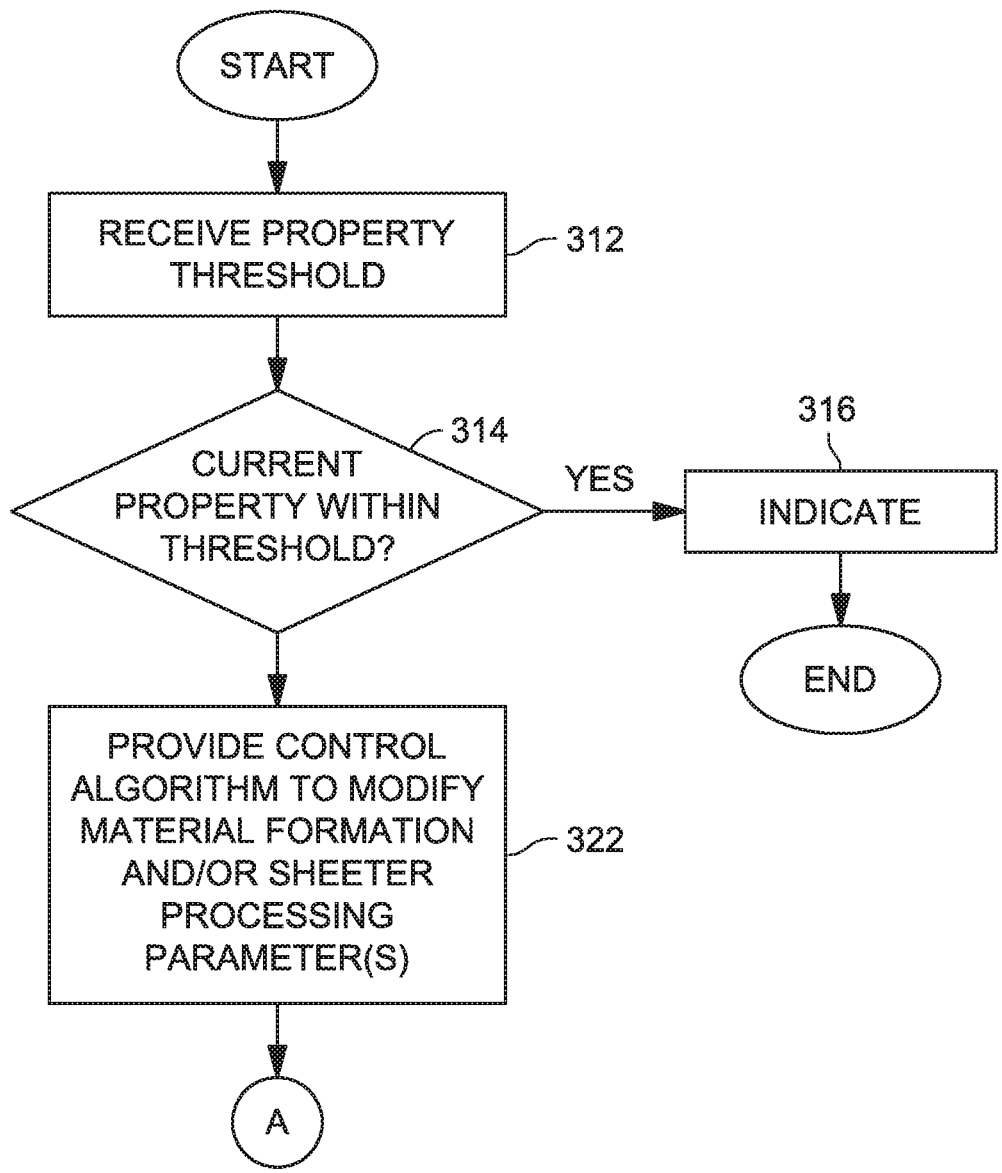
FIG. 5 is a flow diagram showing additional operations of the elastomer rheology process illustrated in FIG. 3, in accordance with an example implementation of the present disclosure.

FIGS. 3 through 5 illustrate implementations of process 300. As shown in FIG. 3, process 300 can include receiving material formation data associated with an elastomer (block 302). For example, processor 402 can receive material formation data via the communications interface 406 (e.g., at a receiver or user interface device). Process 300 can include passing the elastomer through the sheeter 200 to cause a step thickness reduction (block 304). For example, the sheeter 200 processes the elastomer according to a predetermined rolling profile comprising roller gap and speed settings, wherein the roller gap settings can implement a gradual gap reduction and the roller speed settings can implement a static or dynamic roller speed (e.g., gradually increasing/decreasing roller speeds). In an implementation, the controller 400 can be configured to control a roller gap width and a roller speed for the one or more rollers 206 of the sheeter 200 while the elastomer is passed through the sheeter 200. As the elastomer is passed through the sheeter 200, the one or more sensors 202 can sense a first dimension (e.g., entry height, entry width, entry length, entry thickness, etc.) of a first portion of the elastomer before the first portion of the elastomer is passed through the sheeter and can also sense a second dimension (e.g., entry height, entry width, entry length, entry thickness, etc.) of a second portion of the elastomer after the second portion of the elastomer is passed through the sheeter. Step thickness reduction (e.g., gradual flattening) of the elastomer can be implemented by a number of passes through the sheeter, where dimensions (e.g., entry and exit dimensions) and/or other measurements (e.g., force or temperature measurements) can be collected at various points of respective sheeter passes.

Figure 6:
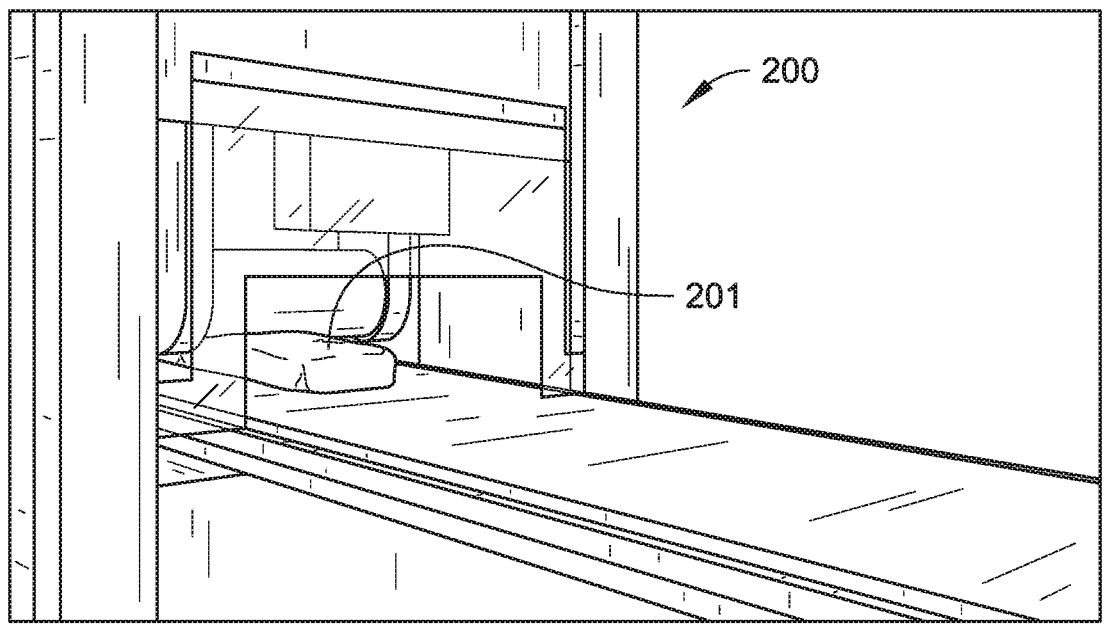
FIG. 6 shows an elastomer being processed by a sheeter, such as the sheeter illustrated in FIG. 2, and graphical plots of roll force and height (or gap width) for processing the elastomer.
Figure 6:
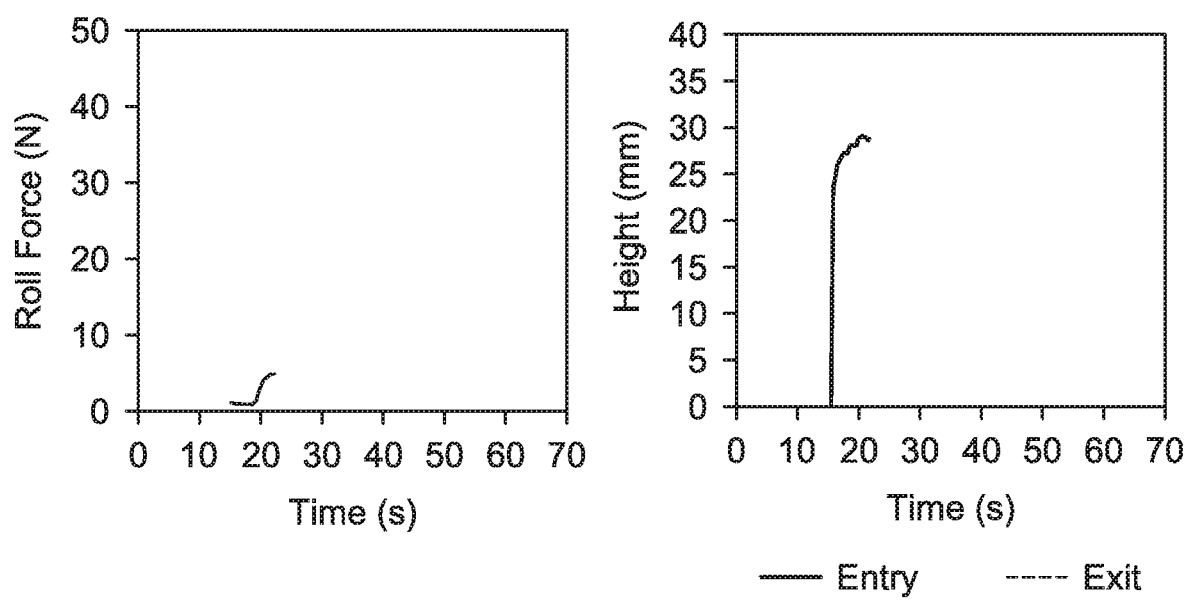
Figure 7:
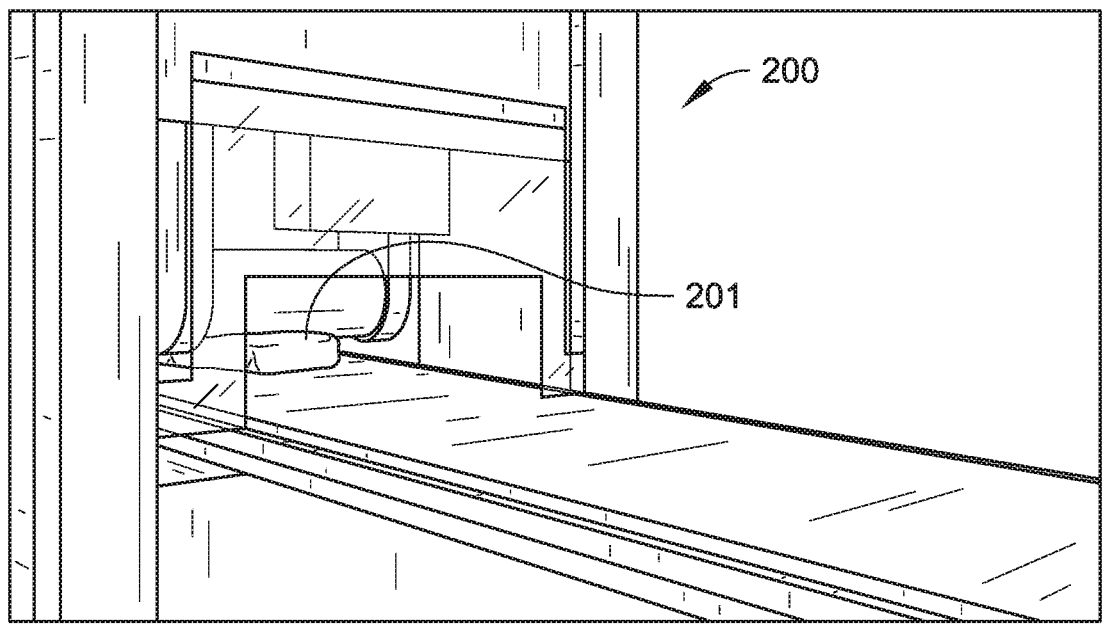
FIG. 7 shows an elastomer being processed by a sheeter, such as the sheeter illustrated in FIG. 2, and graphical plots of roll force and height (or gap width) for processing the elastomer, and a graphical plot of at least one dimension of the elastomer.
Figure 7:
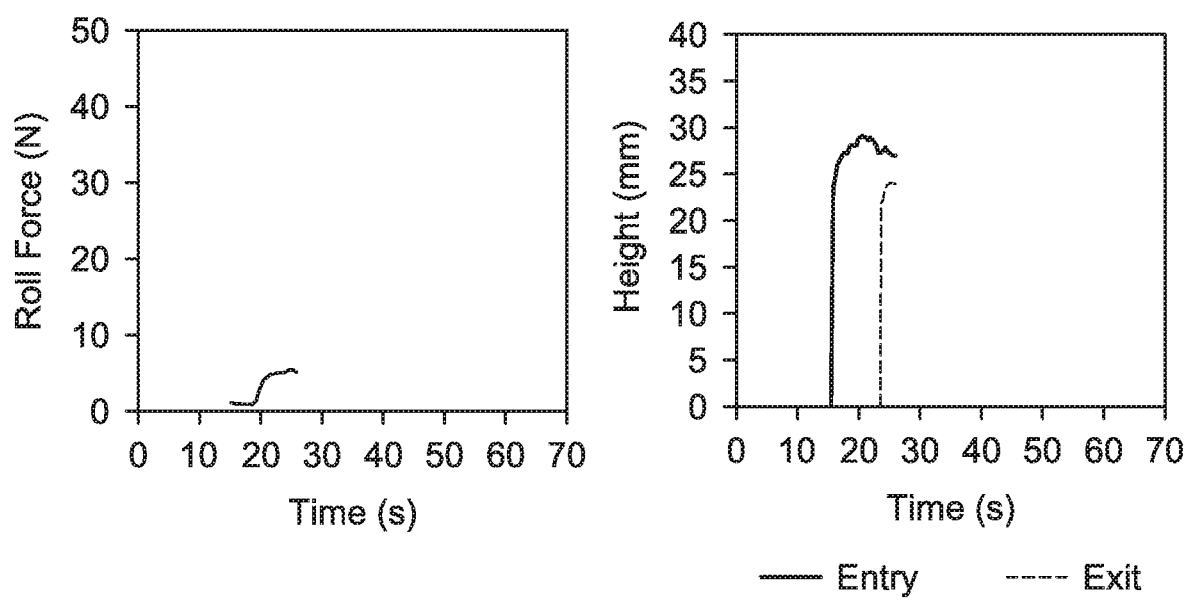
Figure 8:
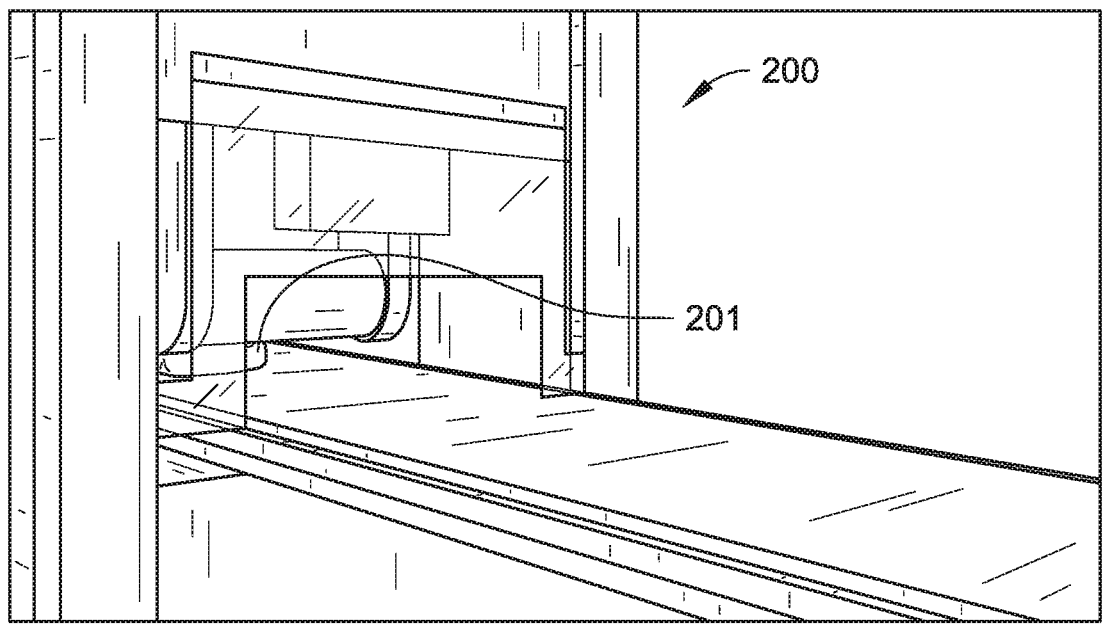
FIG. 8 shows an elastomer being processed by a sheeter, such as the sheeter illustrated in FIG. 2, and graphical plots of roll force and height (or gap width) for processing the elastomer, and a graphical plot of at least one dimension of the elastomer.
Figure 8:
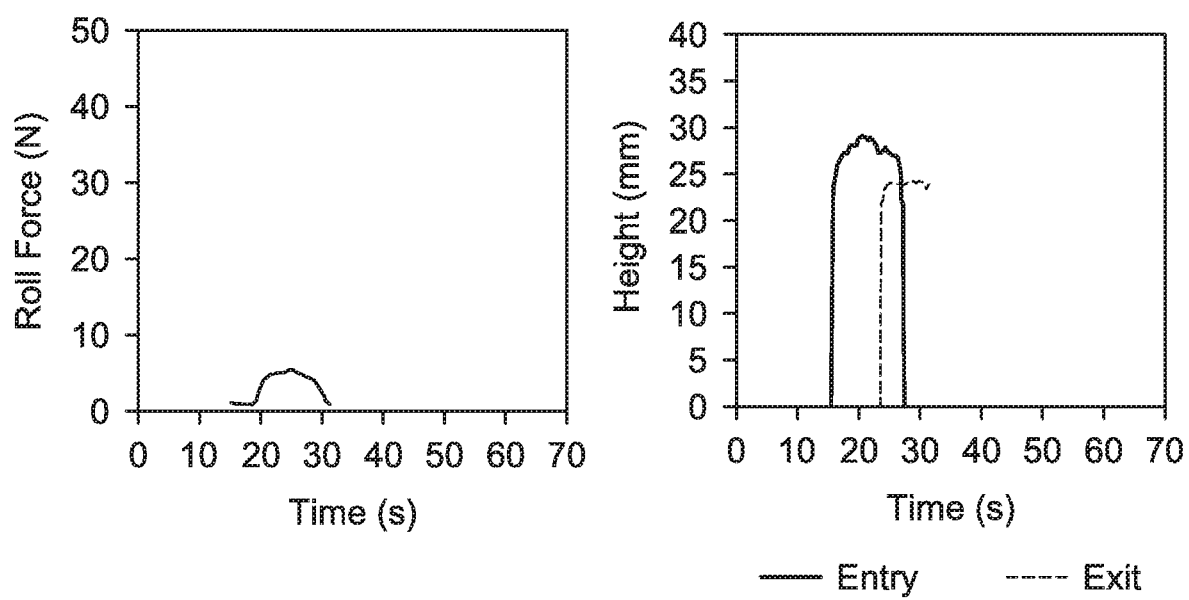
Figure 9:
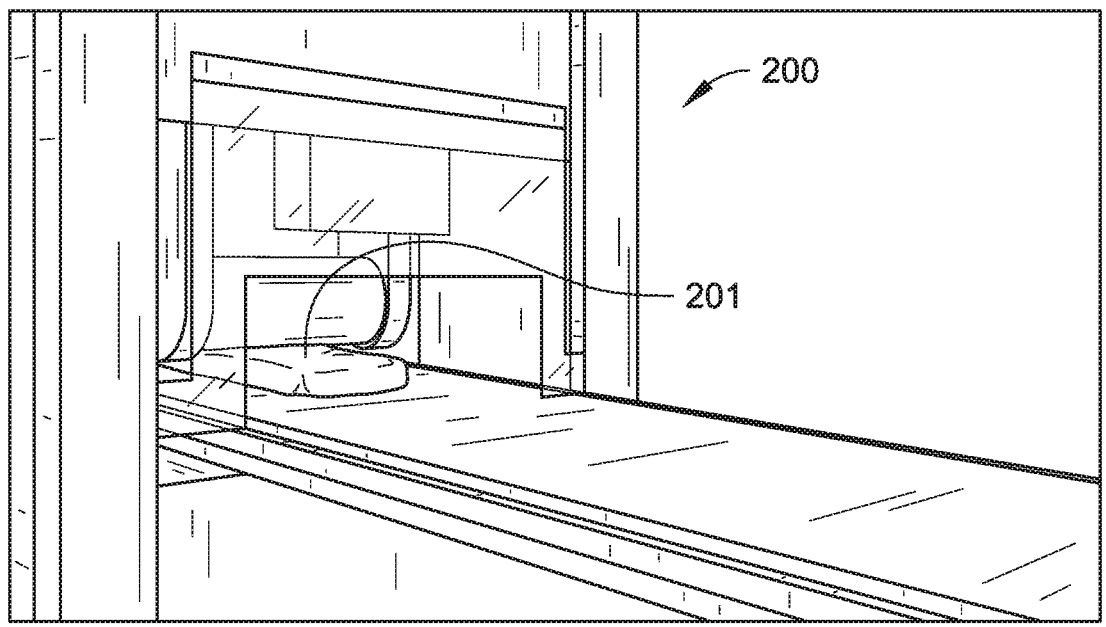
FIG. 9 shows an elastomer being processed by a sheeter, such as the sheeter illustrated in FIG. 2, and graphical plots of roll force and height (or gap width) for processing the elastomer, and a graphical plot of at least one dimension of the elastomer.
Figure 9:
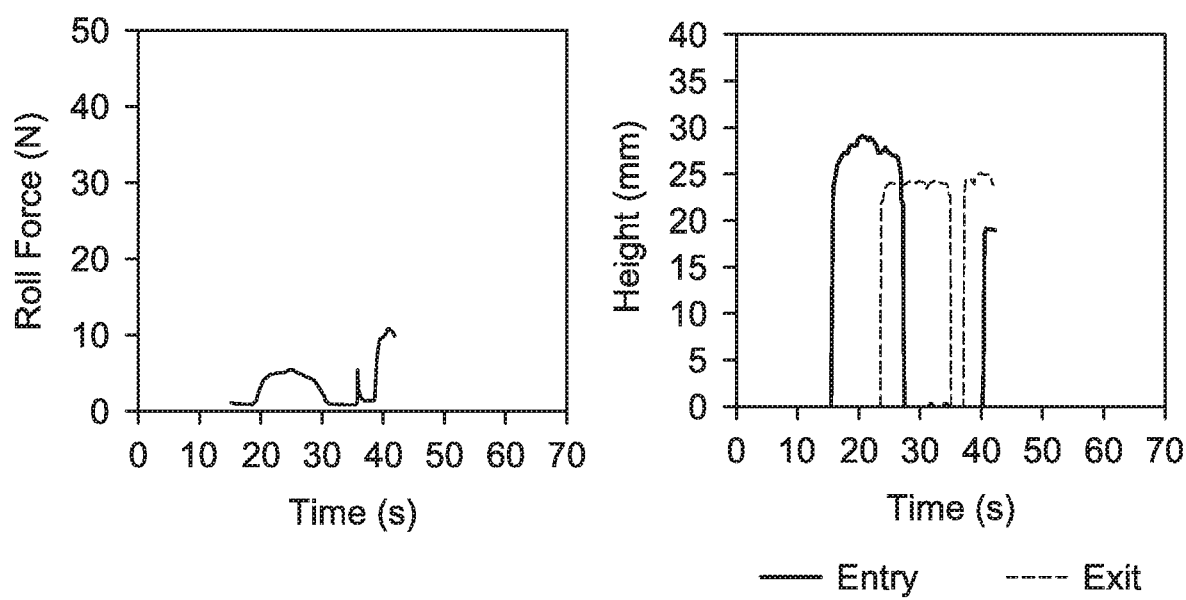
Figure 10:
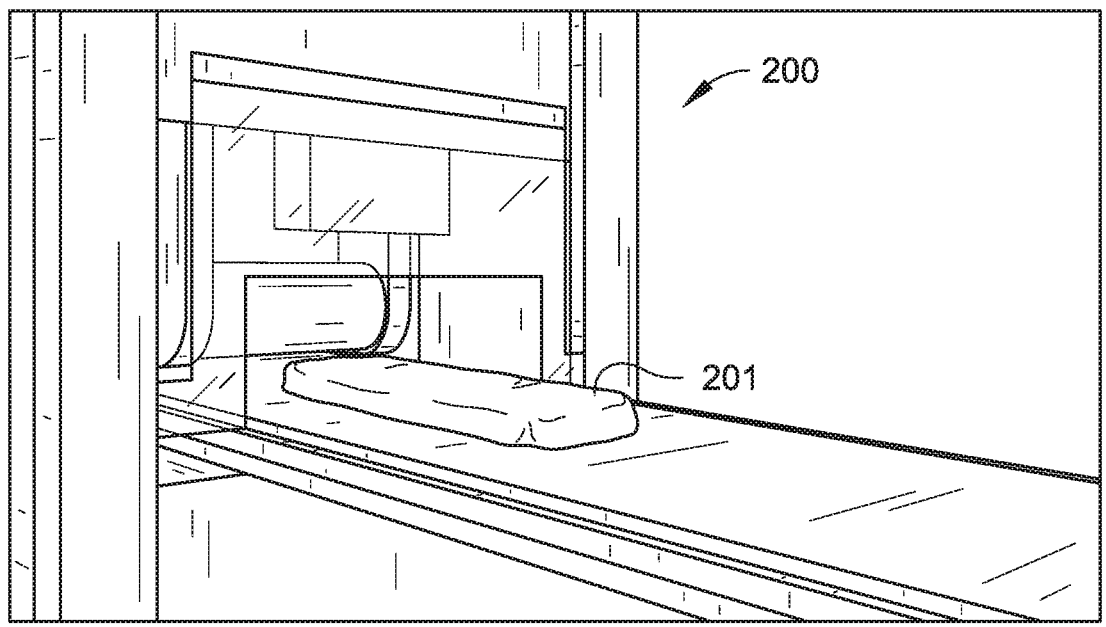
FIG. 10 shows an elastomer being processed by a sheeter, such as the sheeter illustrated in FIG. 2, and graphical plots of roll force and height (or gap width) for processing the elastomer, and a graphical plot of at least one dimension of the elastomer.
Figure 10:
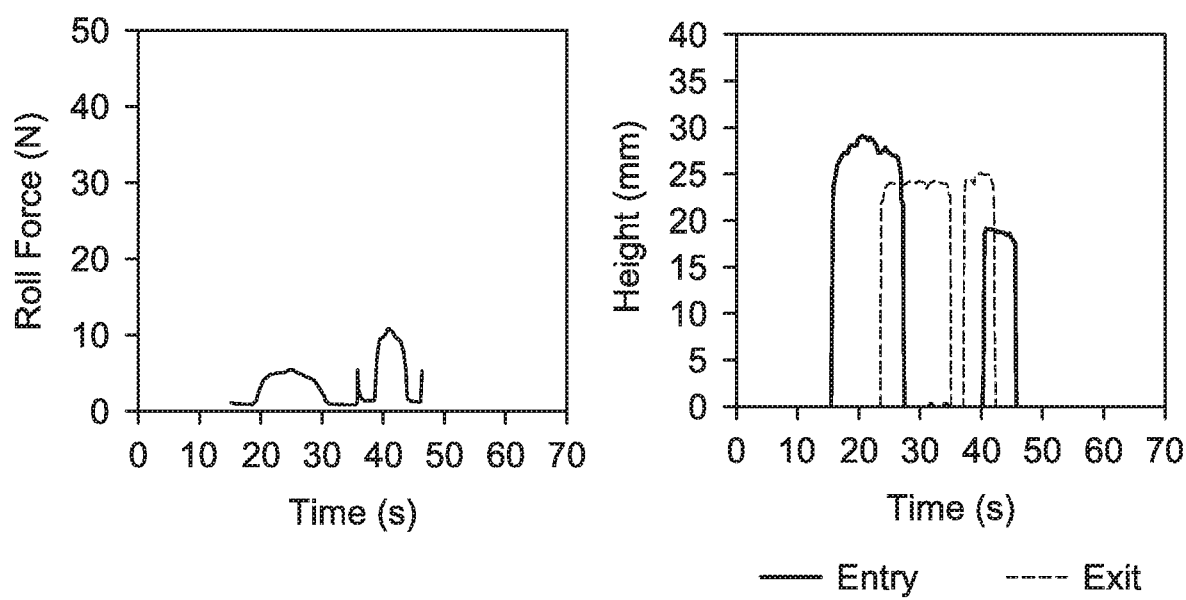
Figure 11:
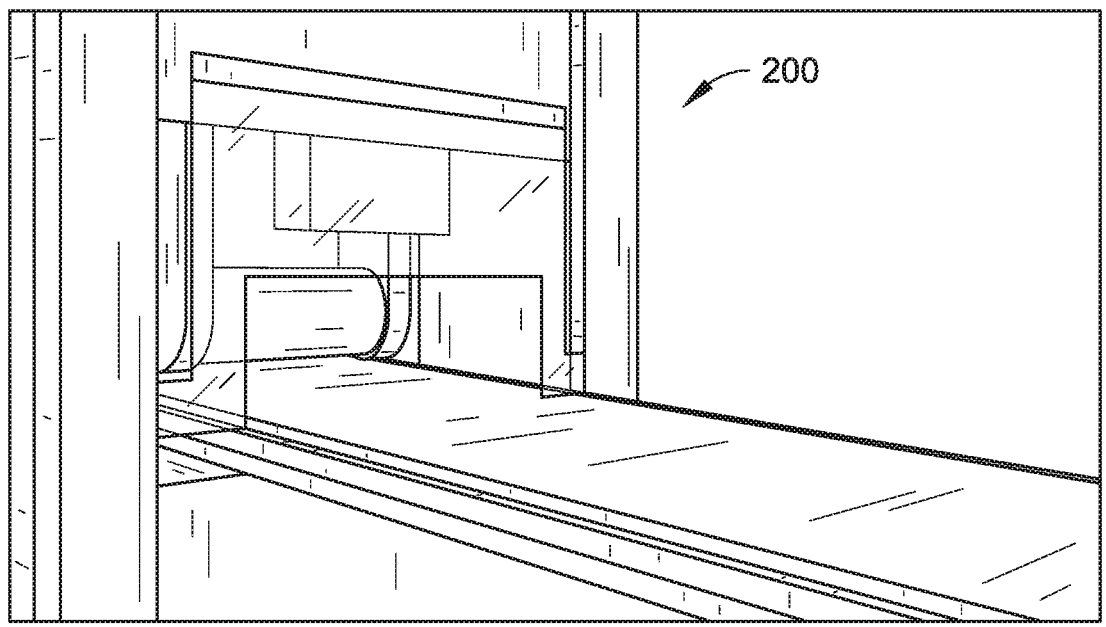
FIG. 11 shows an elastomer being processed by a sheeter, such as the sheeter illustrated in FIG. 2, and graphical plots of roll force and height (or gap width) for processing the elastomer, and a graphical plot of at least one dimension of the elastomer.
Figure 11:
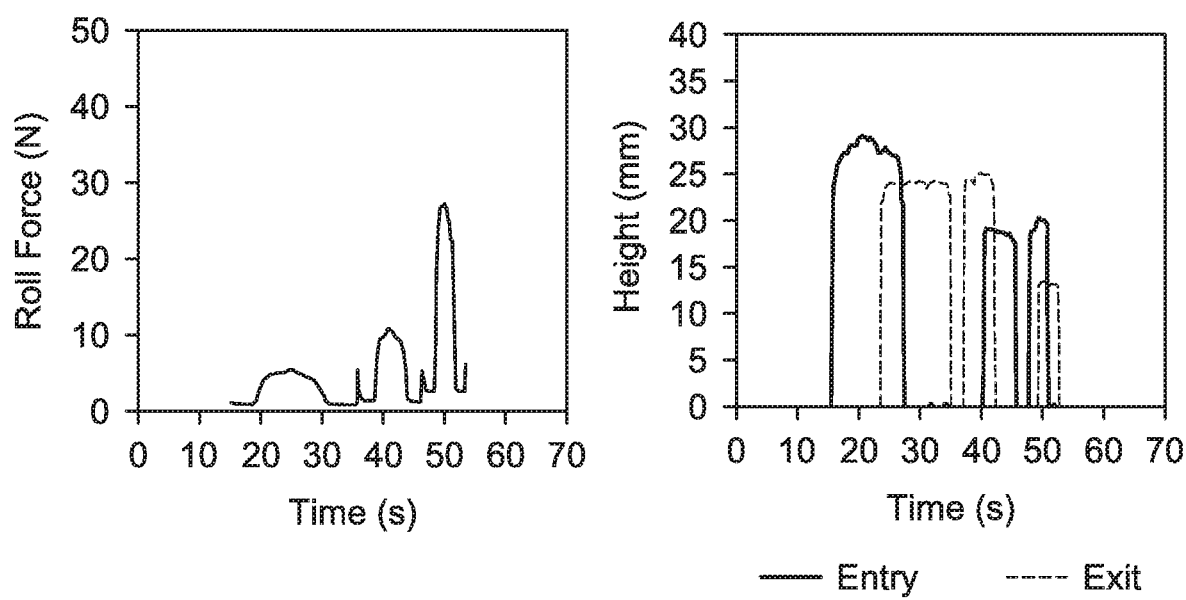
Figure 12:
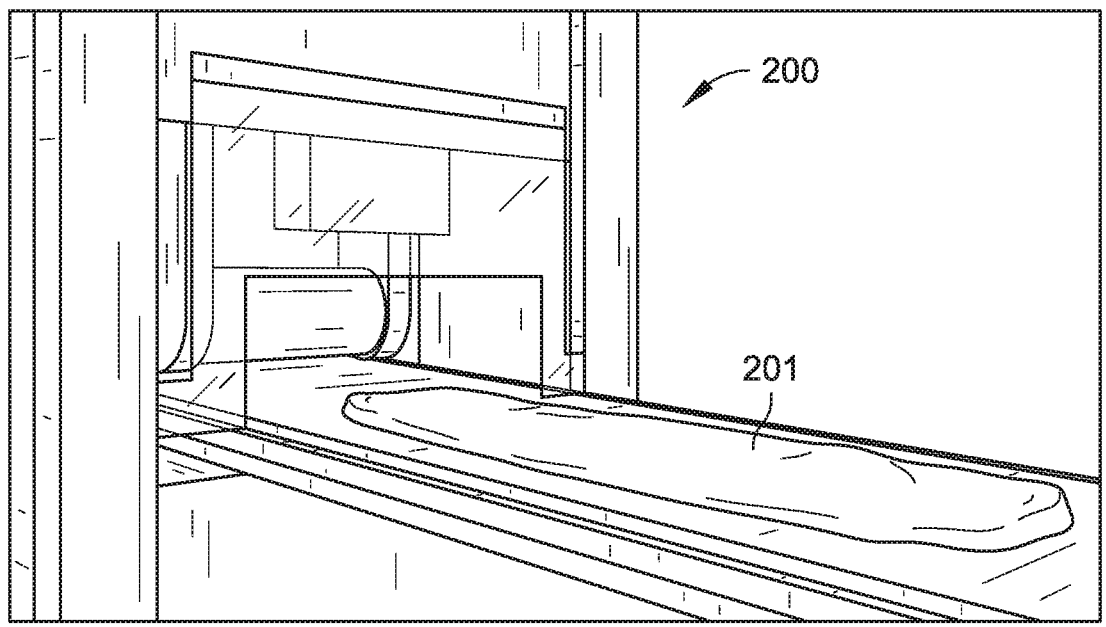
FIG. 12 shows an elastomer being processed by a sheeter, such as the sheeter illustrated in FIG. 2, and graphical plots of roll force and height (or gap width) for processing the elastomer, and a graphical plot of at least one dimension of the elastomer.
Figure 12:
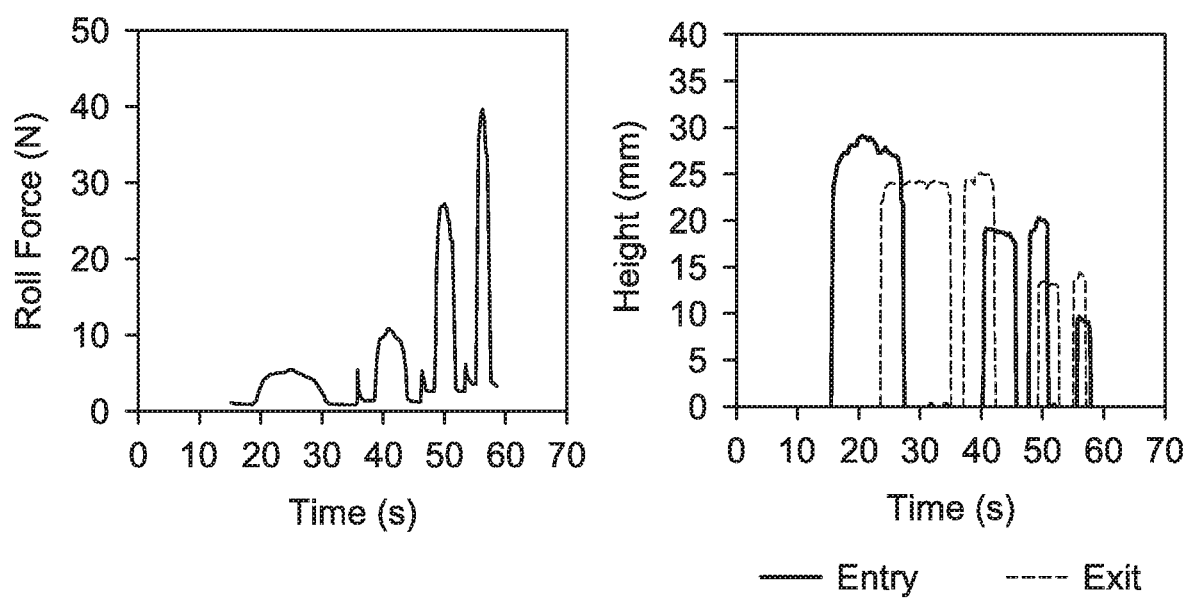

FIGS. 6 through 12 show various stages of a sheeting process and example data collected by the one or more sensors 202 as sheeting passes are performed on a dough. In FIG. 6, the elastomer (e.g., a pad of elastomer material) is shown entering a roller gap (e.g., formed by the one or more rollers 206) of the sheeter 200. At this stage, the roll force begins to increase, and the roller gap thickness and sheet height are at their largest values. FIG. 7 shows the pad passing through the roller gap. At this stage, the roll force reaches a peak and decreases again as the elastomer pad exits the roller gap. The sheet height measured at the entrance goes to zero as the sheet height at the exit increases and reaches a peak value. FIG. 8 shows the pad exiting (e.g., mostly passed through) a roller gap. At this stage, the sheet height measured at the exit may go to zero, indicating that the elastomer pad has cleared the roller gap. In an implementation, sensors 202 can be used to determine when most of the pad has gone through the roller gap based on detecting an absence of pad material on a side of the roller gap. For example, height sensors on opposite sides of the roller gap can sense pad height to determine when the pad has passed completely or almost completely from one side of the roller gap to the other. As shown in FIG. 9, the conveyor 208 can transport the pad to and from the roller gap. When the sensors 202 indicate an absence of the pad on a side of the conveyor 208, the conveyor 208 can be configured to reverse direction and pass the pad through the roller gap again. In implementations, the roller speed and/or roller force may change from one pass to another. FIGS. 10 through 12 shows repetition of the process stages depicted in FIGS. 6 through 9, where with each pass, sensors 202 can indicate when the pad has passed through the roller gap, triggering the sheeter 200 to change direction of movement until a number of passes have been performed. The data plots in FIG. 12 show an example of the resulting roller forces and pad thickness collected at various roller gaps and speeds by passing the pad a number of times through the sheeter 200 while applying a step thickness reduction at each pass. The rheology system 108 can be configured to perform a predetermined number of sheeting passes, or in some implementations, the rheology system 108 can be configured to perform as many sheeting passes as are necessary to establish a data plot that correlates to an expected data curve, range of values, or the like. In an implementation, the elastomer can be processed through multiple sheeter passes to cause a gradual step thickness reduction in order to determine a strain hardening attribute of the elastomer.

Figure 13:
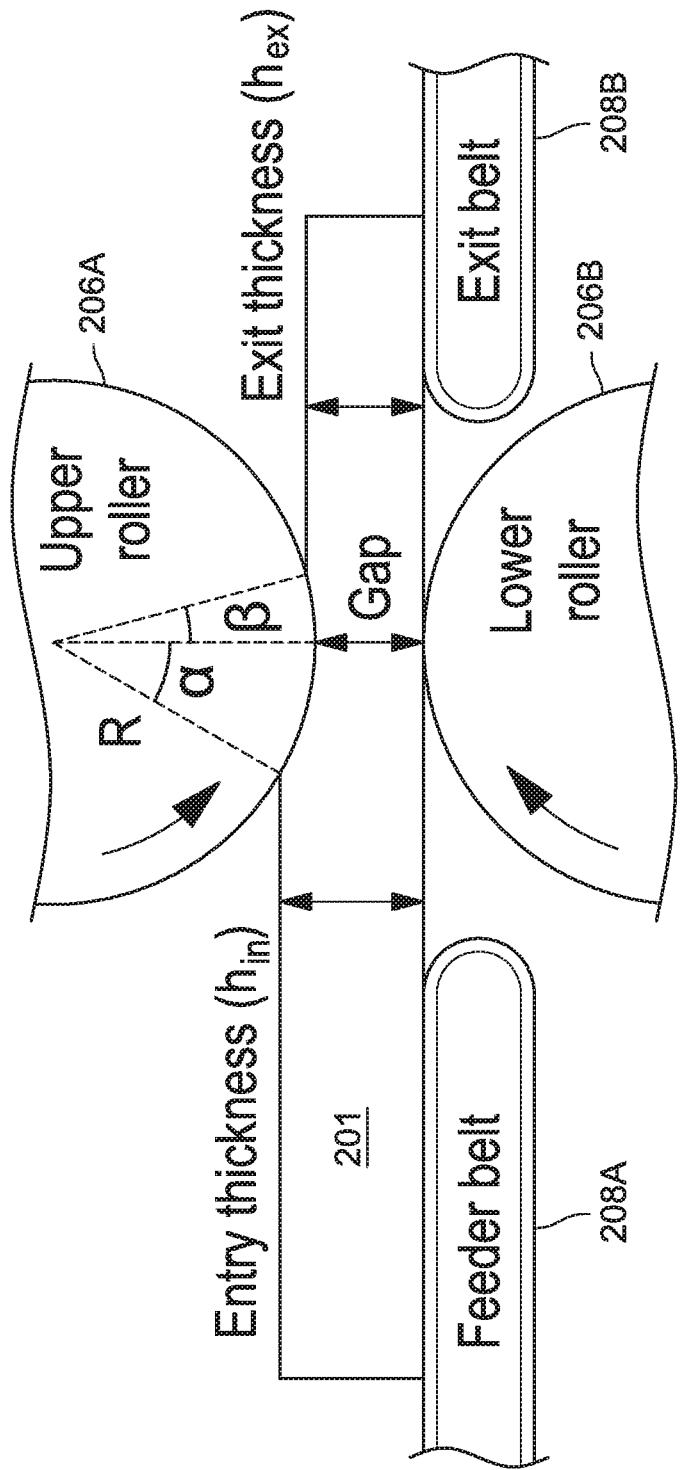
FIG. 13 shows equations for determining an elastomer property based on roll force, height, and dimensions of the elastomer collected at various positions while an elastomer is being processed by a sheeter, such as the sheeter illustrated in FIG. 2.

At block 306, the controller 400 can be configured to calculate at least one elastomer property of the elastomer (e.g., elasticity, strain hardening, stress applied to the elastomer, strain encountered by the elastomer, etc.) based on the controlled roller gap width (or several roller gap width data points), a measured roller force (or several roller force data points), the first dimension (or several first dimension measurements), and the second dimension (or several second dimension measurements). In embodiments, for example, as shown in FIG. 13, the first and second dimension measurements are entry height(s) ($h_{in}$) and exit height(s) ($h_{ex}$) of the elastomer pad (e.g., elastomer 201), respectively. Other dimensions can be used, for example, sheet length and/or width. In implementations, the controller 400 can store one or more calculated elastomer properties with the material formation data (block 308).

FIGS. 13 through 18 are illustrative of analysis performed by the controller 400 to determine various elastomer properties of an elastomer processed by the sheeter 200. With reference to FIG. 13, the controller 400 may be configured to perform calculations corresponding to one or more of the following equations:

$$\alpha = \cos^{-1}\frac{R + \text{Gap} - h_{in}}{R}; \quad (1)$$

$$\beta = \cos^{-1}\frac{R + \text{Gap} - h_{ex}}{R}; \quad (2)$$

Horizontal Projected Contact Area = Sheet Width × ($R \sin\alpha + R \sin\beta$); (3)

$$TVS_x = -\ln\left(\frac{Gap_x}{h_{in}}\right), \text{ where } X \text{ is a real number}, \quad (4)$$

$TVS_x$ is the True Vertical Strain during pass $X$,
and $Gap_x$ is the roller gap height/thickness during pass $X$;

$$\text{Elastic Recovery after pass } X = TVS_x - \left(-\ln\left(\frac{h_{exx}}{h_{in}}\right)\right), \quad (5)$$

where $h_{exx}$ is the height after pass $X$; and $$\text{Roller Stress} = \frac{\text{Roller Force}}{\text{Cross-sectional Area}}. \quad (6)$$

Figure 14:
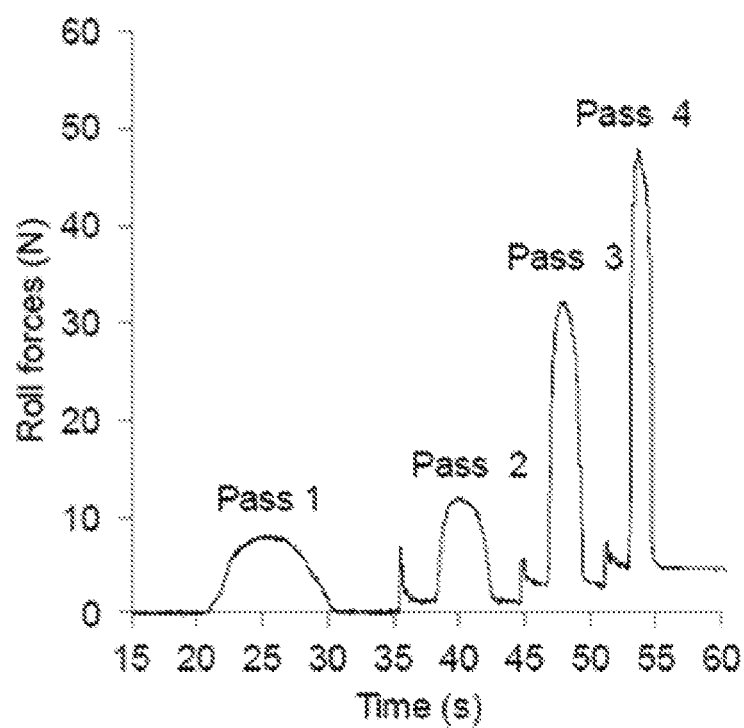
FIG. 14 shows a graphical plot of roll force over time for processing an elastomer with a sheeter, such as the sheeter illustrated in FIG. 2.
Figure 15:
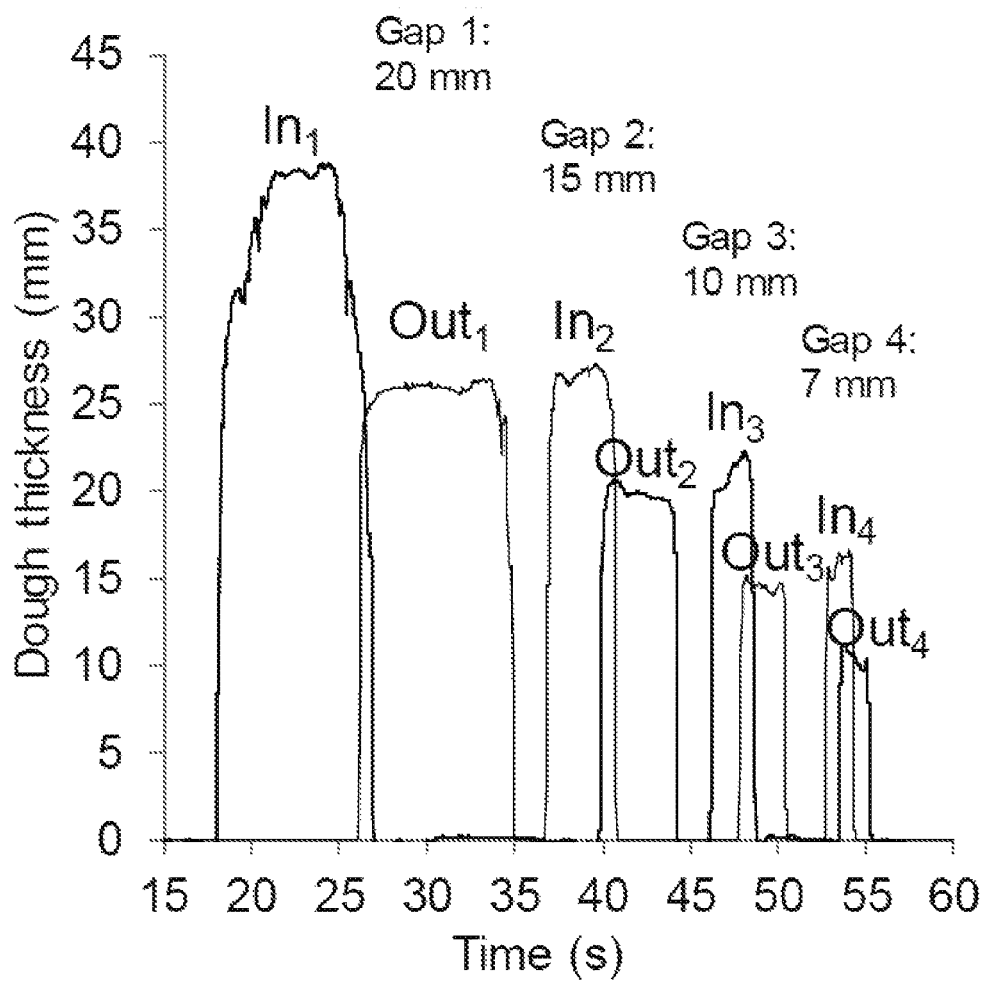
FIG. 15 shows graphical plots of elastomer height before and after a pass through a sheeter, such as the sheeter illustrated in FIG. 2.
Figure 16:
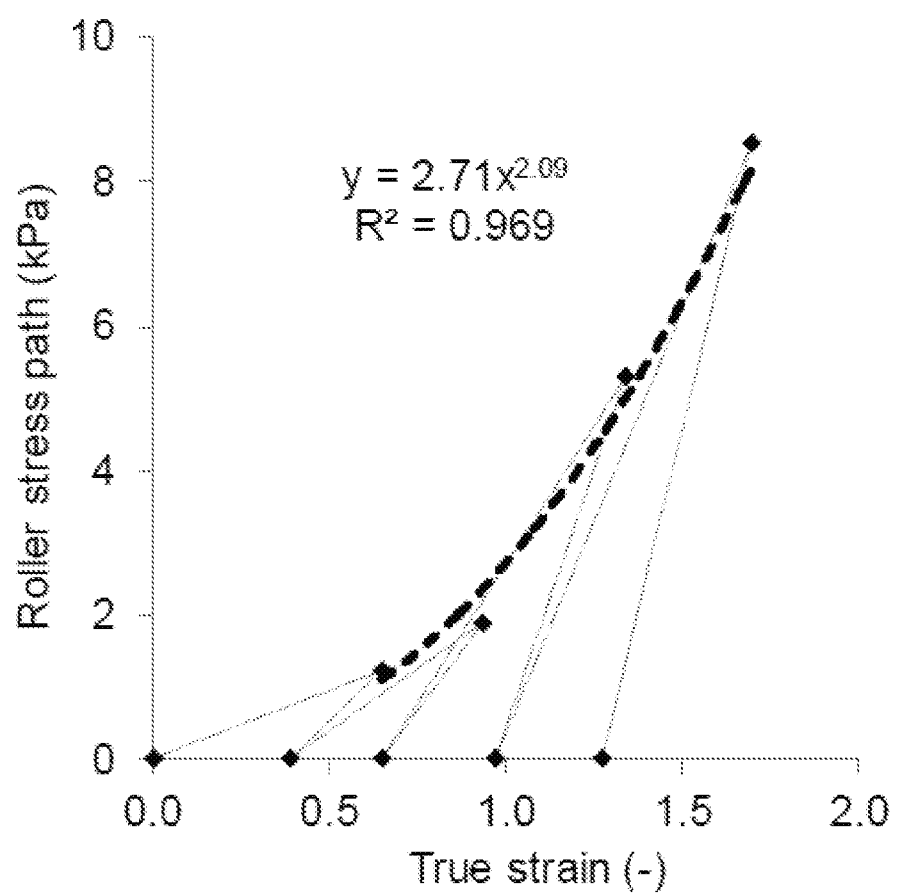
FIG. 16 shows a graphical plot of roller stress vs. true strain as an elastomer is processed by a sheeter, such as the sheeter illustrated in FIG. 2.
Figure 17:
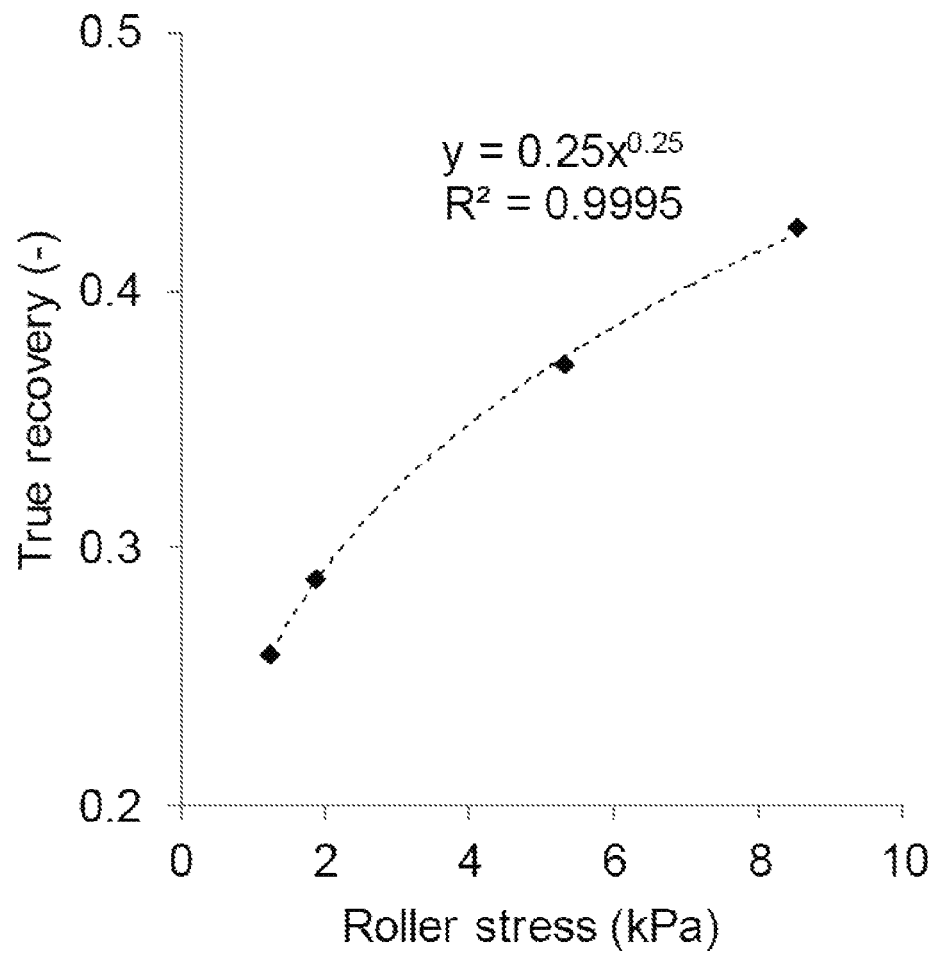
FIG. 17 shows graphical plot of true recovery vs. roller stress as an elastomer is processed by a sheeter, such as the sheeter illustrated in FIG. 2.

FIG. 14 shows an example graphical plot of roll force over time for processing an elastomer (e.g., elastomer 201) with a sheeter (e.g., sheeter 200). In implementations, the roll force may increase from one pass to the next, as the elastomer 201 is flattened/compacted by the sheeter 200. FIG. 15 shows an example graphical plot of the elastomer's 201 sheet height before and after passing through the sheeter 200. As can be seen in FIG. 15, the elastomer 201 decreases in height/thickness from one pass to the next. FIGS. 16 and 17 show example graphical plots of Roller Stress vs. True Vertical Strain (TVS) and Elastic Recovery vs. Roller Stress, respectively. Roller Stress and TVS relate to the elastomer's strain-hardening and can correspond to the stress and strain on the elastomer 201 while being processed by the sheeter 200. Elastic Recovery can correspond to the elastomer's recovery from one pass to the next while being processed by the sheeter 200. FIG. 18 shows a table example values collected for elastomers (e.g., elastomer 201) using a rheology system, such as the rheology system 108 (and sheeter 200) described herein.

Process 300 can also include additional operations (block 310), which are shown in FIGS. 4 and 5. As multiple elastomer samples are analyzed by the rheology system 108, the controller 400 can be configured to generate predictive analytics based on comparisons between different sets of material formation data and corresponding elastomer properties. The controller 400 can also be configured to provide suggestions based on predictive analytics and/or transmit control signals or instructions for the material formation equipment 102 to modify one or more material formation parameters or establish a new material formation control algorithm.

As shown in FIG. 4, the process 300 can further include receiving an elastomer property threshold (block 312). For example, the controller 400 can be configured to receive a threshold or set of thresholds (e.g., one or more ranges) for an elastomer property (e.g., a threshold elasticity or strain hardening value, or the like). The controller 400 may receive one or more threshold elastomer property values by user input, accessing a databased, or receiving one or more instructions via network 106. A comparison can be performed between a calculated elastomer property and at least one threshold value (block 314). For example, the controller 400 can perform a comparison to determine whether or not a calculated elastomer property is within a range defined by the threshold (e.g., at or above the threshold, at or below the threshold, or within a range defined by an upper threshold and a lower threshold). When the elastomer property satisfies the one or more threshold parameters, the controller 400 may provide an indication that the elastomer property is within range (block 316). When the elastomer property is out of range, the controller 400 can provide predictive analytics (block 318). For example, the controller 400 can be configured to report an expected elastomer property response in relation to one or more material formation parameters. The controller 400 can also provide a suggestion for modifying one or more material formation parameters (block 320). For example, the controller 400 can be configured to report one or more process changes that are expected to bring the elastomer property within range based on the predictive analytics. The controller 400 may also be configured to provide the suggestion based on one or more rules. For example, the controller 400 can be configured to provide suggestions that do not violate rules regarding material formation parameters (e.g., threshold mixing time, water content, flour content, or the like). In an implementation shown in FIG. 5, when the calculated elastomer property is out of range, the controller 400 can establish a modified material formation control process/algorithm and/or provide control signals to modify one or more sheeter 200 processing parameters (block 322). For example, rather than providing suggestions or in addition to providing suggestions, the controller 400 can be configured to transmit control signals or instructions for the material formation equipment 102 to modify one or more material formation parameters or establish a new material formation control algorithm. In some implementations, the controller 400 is configured to adjust one or more sheeter 200 processing parameters, such as, but not limited to, roller position(s), roller speed(s), roller gap dimension(s), belt speed(s), and so forth, based on at least one sensor 202 output and/or calculated elastomer property. For example, the controller 400 can be configured to generate control signals that achieve a predetermined profile (e.g., flat profile, linear profile, stair-step profile, etc.) for the roll forces over time and/or relative to changes in sheet thickness of the elastomer 201 during processing by the sheeter 200.

The rheology system 108 and process 300 described herein can provide benefits to constituents of the wheat processing industry. Key issues the industry deals with are to know how much water to add to flour to mix doughs and how long to mix them. Such inabilities also lead to challenges in developing flour blends for target quality doughs as the crop year changes and have hindered innovations in products and processes. Doughs can be differentiated on the basis of both strain-hardening and elasticity of doughs as dough is deformed during processing or baking or even when resting under gravity. Flours can differ in how moisture affects dough rheology with some flours mixing doughs that are robust to variations in moisture amount, while some are highly sensitive to even small differences in moisture in doughs. It has been found that significant correlations are observed between bake quality and dough elasticity, as measured with a sheeter-based rheology system, such as the rheology system 108 described herein. As discussed herein, elastomers are of great interest to non-food industries as well. Thus, the rheology system 108 and process 300 described herein are applicable multiple industries.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An elastomer rheology process comprising:
   receiving material formation data associated with an elastomer;
   conveying the elastomer towards one or more rollers that compress and stretch the elastomer according to an adjustable roller gap and a predetermined roller speed;
   sensing a first dimension of a first portion of the elastomer before the first portion of the elastomer is passed through the sheeter;
   sensing a second dimension of a second portion of the elastomer after the second portion of the elastomer is passed through the sheeter; and
   calculating an elastomer property of the elastomer based on the adjustable roller gap width, a measured roller force, the first dimension, and the second dimension, wherein a gradual gap reduction is applied based on the calculated elastomer property.

2. The elastomer rheology process as recited in claim 1, further comprising:
   comparing the elastomer property with an elastomer property threshold.

3. The elastomer rheology process as recited in claim 2, further comprising:
   generating an indication when the elastomer property is within a range defined by the elastomer property threshold.

4. The elastomer rheology process as recited in claim 2, further comprising:
   generating predictive analytics when the elastomer property is not within a range defined by the elastomer property threshold.

5. The elastomer rheology process as recited in claim 2, further comprising:
   generating a suggested change to a material formation parameter when the elastomer property is not within a range defined by the elastomer property threshold.

6. The elastomer rheology process as recited in claim 2, further comprising:
   generating one or more material formation control parameters when the elastomer property is not within a range defined by the elastomer property threshold.

7. The elastomer rheology process as recited in claim 1, wherein the first dimension and the second dimension are associated with one or more of: elastomer width, elastomer height, elastomer length, elastomer area, elastomer volume, or elastomer stretching.

8. The elastomer rheology process as recited in claim 1, wherein the elastomer property comprises one or more of: a stress applied to the elastomer, a strain encountered by the elastomer, or an elasticity of the elastomer.

9. The elastomer rheology process as recited in claim 1, further comprising:
   processing the elastomer through multiple sheeter passes to effect a gradual step thickness reduction in order to determine a strain hardening attribute of the elastomer.

10. A controller comprising:
    a communications interface;
    a processor; and
    a memory, the memory including one or more software modules that, when executed by the processor, cause the processor to:
    receive, via the communications interface, material formation data associated with an elastomer;
    control an adjustable roller gap width for a sheeter that processes the elastomer when the elastomer is passed through the sheeter;
    receive, via the communications interface, sensor information associated with a first dimension of a first portion of the elastomer before the first portion of the elastomer is passed through the sheeter;
    receive, via the communications interface, sensor information associated with a second dimension of a second portion of the elastomer after the second portion of the elastomer is passed through the sheeter; and
    calculate an elastomer property of the elastomer based on the adjustable roller gap width, a measured roller force, the first dimension, and the second dimension, wherein a gradual gap reduction is applied based on the calculated elastomer property.

11. The controller as recited in claim 10, wherein one or more software modules, when executed by the processor, further cause the processor to:
    compare the elastomer property with an elastomer property threshold.

12. The controller as recited in claim 11, wherein one or more software modules, when executed by the processor, further cause the processor to:
    generate an indication when the elastomer property is within a range defined by the elastomer property threshold.

13. The controller as recited in claim 11, wherein one or more software modules, when executed by the processor, further cause the processor to:
    generate predictive analytics when the elastomer property is not within a range defined by the elastomer property threshold.

14. The controller as recited in claim 11, wherein one or more software modules, when executed by the processor, further cause the processor to:

generate a suggested change to a material formation parameter when the elastomer property is not within a range defined by the elastomer property threshold.

15. The controller as recited in claim 11, wherein one or more software modules, when executed by the processor, further cause the processor to:
generate one or more material formation control parameters when the elastomer property is not within a range defined by the elastomer property threshold.

16. The controller as recited in claim 10, wherein the first dimension and the second dimension are associated with one or more of: elastomer width, elastomer height, elastomer length, elastomer area, or elastomer volume.

17. The controller as recited in claim 10, wherein the elastomer property comprises one or more of: a stress applied to the elastomer, a strain encountered by the elastomer, or an elasticity of the elastomer.

18. An elastomer rheology system comprising:
a sheeter including:
one or more actuators configured to position and drive one or more rollers of the sheeter; and
one or more sensors configured to sense one or more dimensions of an elastomer when the elastomer is being processed by the sheeter; and
a controller in communication with the sheeter, the controller including:
a communications interface;
a processor; and
a memory, the memory including one or more software modules that, when executed by the processor, cause the processor to:
receive, via the communications interface, material formation data associated with an elastomer;
control an adjustable roller gap width and a measure roller force applied by the one or more rollers when the elastomer is passed through the sheeter;
receive from the one or more sensors, via the communications interface, sensor information associated with a first dimension of a first portion of the elastomer before the first portion of the elastomer is passed through the sheeter;
receive from the one or more sensors, via the communications interface, sensor information associated with a second dimension of a second portion of the elastomer after the second portion of the elastomer is passed through the sheeter; and
calculate an elastomer property of the elastomer based on the adjustable roller gap width, a measured roller force, the first dimension, and the second dimension.

19. The elastomer rheology system as recited in claim 18, wherein one or more software modules, when executed by the processor, further cause the processor to:
compare the elastomer property with an elastomer property threshold.

20. The elastomer rheology system as recited in claim 19, wherein one or more software modules, when executed by the processor, further cause the processor to:
generate an indication when the elastomer property is within a range defined by the elastomer property threshold.

21. The elastomer rheology system as recited in claim 19, wherein one or more software modules, when executed by the processor, further cause the processor to:
generate predictive analytics when the elastomer property is not within a range defined by the elastomer property threshold.

22. The elastomer rheology system as recited in claim 19, wherein one or more software modules, when executed by the processor, further cause the processor to:
generate a suggested change to a material formation parameter when the elastomer property is not within a range defined by the elastomer property threshold.

23. The elastomer rheology system as recited in claim 19, wherein one or more software modules, when executed by the processor, further cause the processor to:
generate one or more form formation control parameters when the elastomer property is not within a range defined by the elastomer property threshold.

24. The elastomer rheology system as recited in claim 18, wherein the first dimension and the second dimension are associated with one or more of: elastomer width, elastomer height, elastomer length, elastomer area, or elastomer volume.

25. The elastomer rheology system as recited in claim 18, wherein the elastomer property comprises one or more of: a stress applied to the elastomer, a strain encountered by the elastomer, or an elasticity of the elastomer.

26. The elastomer rheology system as recited in claim 18, wherein the one or more sensors include one or more of: a height sensor, a thickness sensor, a surface area sensor, a longitudinal extension sensor, or a latitudinal extension sensor.

* * * * *